(12) United States Patent
Ohgi

(10) Patent No.: US 7,343,612 B2
(45) Date of Patent: Mar. 11, 2008

(54) DISC CARTRIDGE

(75) Inventor: Takashi Ohgi, Miyagi (JP)

(73) Assignee: Sony Corporation, Tokyo (JP)

( * ) Notice: Subject to any disclaimer, the term of this patent is extended or adjusted under 35 U.S.C. 154(b) by 486 days.

(21) Appl. No.: 11/013,423

(22) Filed: Dec. 17, 2004

(65) Prior Publication Data

US 2005/0160445 A1    Jul. 21, 2005

(30) Foreign Application Priority Data

Jan. 8, 2004    (JP)    ............................ 2004-003444
May 10, 2004   (JP)    ............................ 2004-140471

(51) Int. Cl.
*G11B 23/04*    (2006.01)

(52) U.S. Cl. ................................... 720/738
(58) Field of Classification Search ......... 720/738–743
See application file for complete search history.

(56) References Cited

U.S. PATENT DOCUMENTS 5,671,212 A * 9/1997 Miyazaki et al. ........... 720/738
2005/0160445 A1  7/2005 Ohgi

FOREIGN PATENT DOCUMENTS

| EP | 0 440 175 B1 | 9/1997 |
| JP | 61-189470 | 8/1986 |
| JP | 5-89630 | 4/1993 |
| JP | 7-6493 | 1/1995 |
| JP | 7-296541 | 11/1995 |
| JP | 2000-67552 | 3/2000 |
| JP | 2000-260153 | 9/2000 |

OTHER PUBLICATIONS

U. S. Appl. No. 10/556,809, filed Nov.15, 2005, Ohgi.

* cited by examiner

*Primary Examiner*—A. J. Heinz
*Assistant Examiner*—Mark Blouin
(74) *Attorney, Agent, or Firm*—Oblon, Spivak, McClelland, Maier & Neustadt, P.C.

(57) ABSTRACT

A cartridge main body formed by aligning and bonding a pair of an upper half and a lower half rotatably contains an optical disc. The cartridge main body is provided on one of the opposite surfaces thereof with a central aperture, which is a drive aperture for receiving a drive means for driving the optical disc to turn, and a head receiving aperture, which is a recording and/or reproduction aperture for receiving a recording and/or reproduction means. A shutter member is fitted to the cartridge main body. The shutter member has a shutter section for exposing and closing the heard receiving aperture and is adapted to move to expose and close the head receiving aperture while it is supported at the base thereof within a range of one of the lateral sides thereof that is perpendicular to the above mentioned surface of the cartridge main body. The shutter section of the shutter member is supported at the front end thereof by a shutter guide member arranged between the central aperture and the head receiving aperture.

16 Claims, 13 Drawing Sheets

DISC CARTRIDGE

BACKGROUND OF THE INVENTION

1. Field of the Invention

This invention relates to a disc cartridge containing a disc-shaped recording medium such as optical disc.

This application claims priority of Japanese Patent Application No. 2004-003444, filed on Jan. 8, 2004 and Japanese Patent Application No. 2004-140471, filed on May 10, 2004, the entireties of which are incorporated by reference herein.

2. Description of Related Art

Disc cartridges rotatably containing a disc-shaped recording medium such as optical disc so as to be loaded in a recording and/or reproduction apparatus with the disc-shaped recording medium contained therein have been and are being used popularly. Disc cartridges of the type under consideration are adapted to protect the disc-shaped recording mediums contained therein and to be loaded in and unloaded from a recording and/or reproduction apparatus with ease.

To make disc cartridges adapted to be loaded in and unloaded from a recording and/or reproduction apparatus with a disc-shaped recording medium contained therein, the cartridge main body is provided with a drive aperture for receiving the turn table of a rotary disc drive mechanism for driving the disc-shaped recording medium to rotate and a recording and/or reproduction aperture for exposing part of the signal recording region of the disc-shaped recording medium extending between the inner periphery and the outer periphery of the disc-shaped recording medium to the outside.

The drive aperture is circular and formed substantially at the center of one of the opposite surfaces of the cartridge main body so as to expose a central part of the disc-shaped recording medium contained in the cartridge main body where a center hole is bored. On the other hand, the recording and/or reproduction aperture is formed on one or both of the opposite surfaces of the cartridge main body. The recording and/or reproduction aperture formed on one of the opposite surfaces of the cartridge main body has a rectangular contour and extend from a position close to the drive aperture to a lateral side of the cartridge main body.

As the disc cartridge is loaded in a recording and/or reproduction apparatus, the disc-shaped recording medium contained in the disc cartridge receives the turn table of the apparatus through the drive aperture. As the disc-shaped recording medium is driven by the turn table to rotate, the signal recording region thereof is scanned by the recording/reproduction head section of the recording and/or reproduction apparatus, which may typically an optical pickup to which the recording and/or reproduction aperture is exposed, and information is recorded and/or reproduced.

Meanwhile, if the recording and/or reproduction aperture of the cartridge main body is left uncovered, dust can enter the cartridge main body when the disc cartridge is not loaded in a recording and/or reproduction apparatus and simply stored in a storage to contaminate and damage the disc-shaped recording medium contained in the cartridge main body.

Therefore, disc cartridges containing a disc-shaped recording medium are provided with a shutter member for closing at least the recording and/or reproduction aperture. The shutter member is fitted to the disc cartridge so as to be movable between a position where it closes the recording and/or reproduction aperture and a position where it exposes the recording and/or reproduction aperture.

Some disc cartridges containing a disc-shaped recording medium are provided with a drive aperture having a recording and/or reproduction aperture only on one of the opposite surfaces thereof. Since such disc cartridges do not have any opening on the other surface, the entire surface can be used to carry a label or a design can be directly printed thereon.

Thus, disc cartridges having openings only on one of the surfaces are provided with a shutter member for opening and closing the recording and/or reproduction aperture whose shutter section extends only on the surface of the cartridge main body where the openings are arranged. The shutter section of the shutter/guide member for opening and closing the recording and/or reproduction aperture extends only on that surface of the cartridge main body and the shutter/guide member is a cantilever type member that is fitted to a lateral side of the cartridge main body by way of a support section arranged at the base of the shutter section.

Since the shutter member having the above-described profile is supported by the cartridge main body only at the base of the shutter section, its front end may lift up from the surface of the cartridge main body. Additionally, when the disc cartridge is put into a recording and/or reproduction apparatus, the shutter member is subjected to the force that is applied to the shutter opening/closing member of the recording and/or reproduction apparatus at the base thereof Therefore, when the shutter member is moved to expose the recording and/or reproduction aperture, it swings around the base so that the front end of the shutter member may remarkably lift up from the surface of the cartridge main body.

Such a lifting up phenomenon of the shutter member can be suppressed by reducing the length of the shutter section thereof. However, if the length of the shutter section is reduced, the length of the recording and/or reproduction aperture has also to be reduced. Then, the signal recording region of the disc-shaped recording medium that is contained in the cartridge main body cannot be exposed largely between the inner and outer peripheries thereof In other words, the area of the signal recording region of the disc-shaped recording medium needs to be reduced to make it difficult to provide the disc-shaped recording medium with a large recording capacity.

Meanwhile, efforts have been and are being paid to realize a high density recording on disc-shaped recording mediums and it is current possible to record a considerably large volume of information on a small disc-shaped recording medium. Then, disc cartridges for containing such a small disc-shaped recording medium are also downsized.

As the small disc-shaped recording medium contained in a downsized disc cartridge is made to be exposed largely between the inner and outer peripheries thereof in order to increase the area of the signal recording region, the recording and/or reproduction aperture is forced to extend its length between the inner and outer peripheries of the disc-shaped recording medium. However, the width of the area where the shutter member moves cannot be increased in proportion to the increased length. In other words, the width of the recording and/or reproduction aperture has to be inevitably limited if the shutter member is to be moved within the area of the cartridge main body in order to reliably expose the recording and/or reproduction aperture. As a result, the shutter section of the shutter member for closing the recording and/or reproduction aperture is made to show an oblong profile. As the shutter member having such an oblong shutter section is driven to move by the force applied to the base of the shutter section, it swings around the base and its front end remarkably moves up from the corresponding surface of the cartridge main body.

If the shutter member moves up from the cartridge main body when the disc cartridge is loaded in the recording and/or reproduction apparatus, it is no longer possible to reliably load and unload the disc cartridge and the disc cartridge and the mechanical part of the recording and/or reproduction apparatus can be damaged.

Additionally, in the downsized disc cartridge, if the recording and/or reproduction aperture is formed to largely expose the disc-shaped recording medium between the inner and outer peripheries thereof, the open area of the disc cartridge including the drive aperture is increased to reduce the physical strength of the cartridge main body.

Japanese Patent Application Laid-Open Publication No. 2001-314 discloses a disc cartridge having a cartridge main body that is provided with recording/reproduction apertures on the opposite surfaces thereof and shutter members for opening and closing the respective apertures and adapted to prevent the front end of the shutter section for opening and closing a region extending from the recording and/or reproduction aperture to the drive aperture of one of the surfaces from lifting up.

SUMMARY OF THE INVENTION

In view of the above identified circumstances, it is therefore an object of the present invention to provide a disc cartridge in which a cantilever type shutter member having a shutter section supported by the cartridge main body and adapted to open and close the aperture arranged on one of the surfaces thereof can move stably.

Another object of the present invention is to provide a disc cartridge having a large recording and/or reproduction aperture that is at the same time mechanically reliably strong and durable.

Still another object of the present invention is to provide a disc cartridge that can be reliably loaded in and unloaded from a recording and/or reproduction apparatus.

Still another object of the present invention is to provide a disc cartridge having a large label application surface area or a printing surface area.

A further object of the present invention is to provide a disc cartridge that has a shutter member and at the same time allows the entire disc-shaped recording medium contained in the cartridge main body to be visually observed.

According to the present invention, the above objects and other objects of the invention are achieved by providing a disc cartridge comprising: a cartridge main body formed by aligning and bonding paired upper and lower halves to rotatably contain a disc therein and having a drive aperture for receiving a rotary disc drive means for driving the disc to rotate and a recording and/or reproduction aperture to be exposed to a recording and/or reproduction means for recording information on and/or reproducing information from the disc only on one of the surfaces thereof, a shutter member having a shutter section for closing the recording and/or reproduction aperture and fitted to the cartridge main body so as to be supported at a lateral side running perpendicularly relative to the surface and able to move open and close the recording and/or reproduction aperture; and a shutter guide member arranged between the drive aperture and the recording and/or reproduction aperture to support the shutter section at the front end thereof.

Thus, in a disc cartridge according to the invention, the shutter section for opening and closing the recording and/or reproduction aperture that is arranged on one of the surfaces of the cartridge main body is supported by the shutter guide member at the front end thereof, it is prevented from lifting up from the cartridge main body to allow the shutter member to move reliably.

Additionally, since the shutter section is prevented from lifting up, the disc cartridge can be reliably loaded in and unloaded from a recording and/or reproduction apparatus to protect the disc cartridge and the recording and/or reproduction apparatus to be used with the disc cartridge.

Still additionally, since a disc cartridge according to the invention has a link area for arranging the shutter guide member between the drive aperture and the recording and/or reproduction aperture, the mechanical strength of the cartridge main body is secured.

Still additionally, since the leading edge of the cartridge main body containing a disc-shaped recording medium therein that is to be firstly moved into a recording and/or reproduction apparatus is made to show a contour of the arc of a semicircle having its center aligned with the center of the disc-shaped recording medium contained in the cartridge main body, it is possible to downsize the cartridge main body proportionally relative to the size of the disc-shaped recording medium contained therein.

Since the shutter guide member is provided with an arc-shaped notch that matches the peripheral edge of the circular drive aperture, the drive aperture and the recording and/or reproduction aperture can be brought close to each other and the recording and/or reproduction aperture can be made large. As the recording and/or reproduction aperture is made large, it is possible to provide the disc-shaped recording medium with a large signal recording region that extend largely between the inner and outer peripheries of the disc-shaped recording medium to realize a large recording capacity.

Still additionally, since the shutter guide member is arranged in a recess that is formed in the cartridge main body, it does not project from the corresponding surface of the cartridge main body when it is fitted in position so that the surface of the cartridge main body can be made very flat when the shutter guide member is fitted thereto. The recess has an arc-shaped part that corresponds to the arc-shaped notch of the shutter guide member. The shutter guide member can be fitted to the drive aperture without interfering with each other when the diameter of the arc-shaped notch of the shutter guide member is made larger than that of the arc-shaped part of the recess.

Still additionally, the shutter guide member is bonded to the cartridge main body by ultrasonic welding along the long opposite ends thereof except the narrow part where the arc-shaped notch is formed. Thus, the shutter guide member is rigidly secured to the cartridge main body without any risk of damaging the narrow part of the cartridge main body.

The shutter member can be moved stably and reliably because the lateral side of the cartridge main body along which the shutter member moves is held in parallel with the moving direction of the shutter member.

Finally, the upper half of the cartridge main body where no aperture is formed is made of a transparent material, the disc-shaped recording medium contained in the cartridge main body is visible from the outside.

DETAILED DESCRIPTION OF THE PREFERRED EMBODIMENTS

Now, a disc cartridge according to the present invention will be described in greater detail by referring to the accompanying drawings that illustrate a preferred embodiment of the invention.

Figure 1:
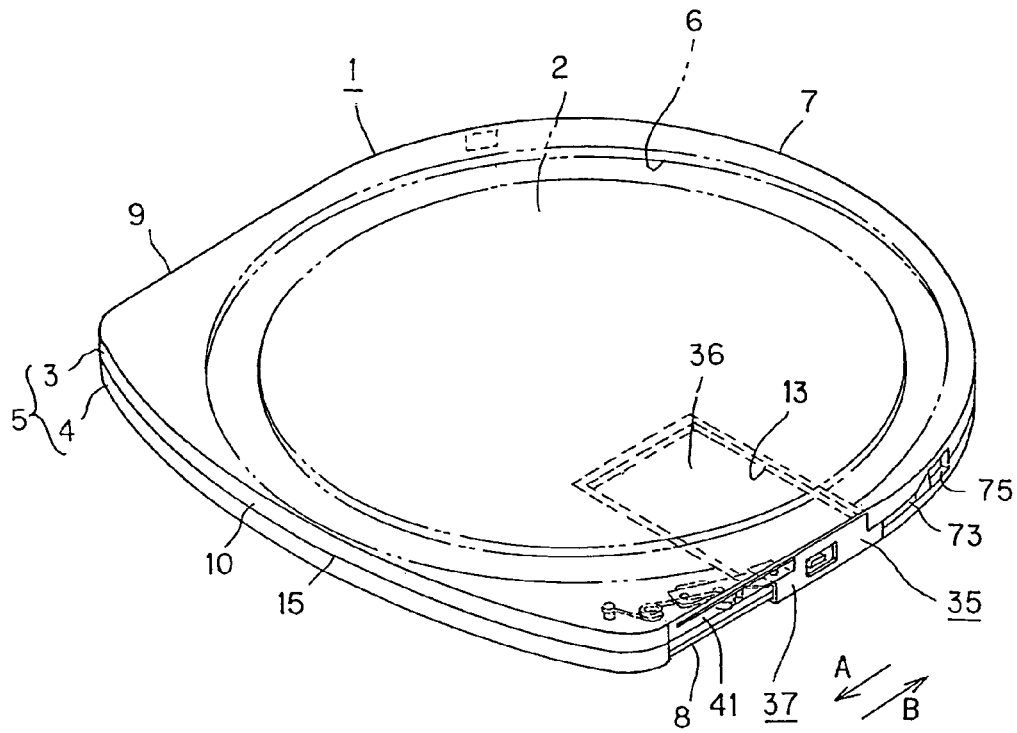
FIG. 1 is a schematic perspective view of a disc cartridge according to the invention as viewed from the side of the upper half thereof.
Figure 2:
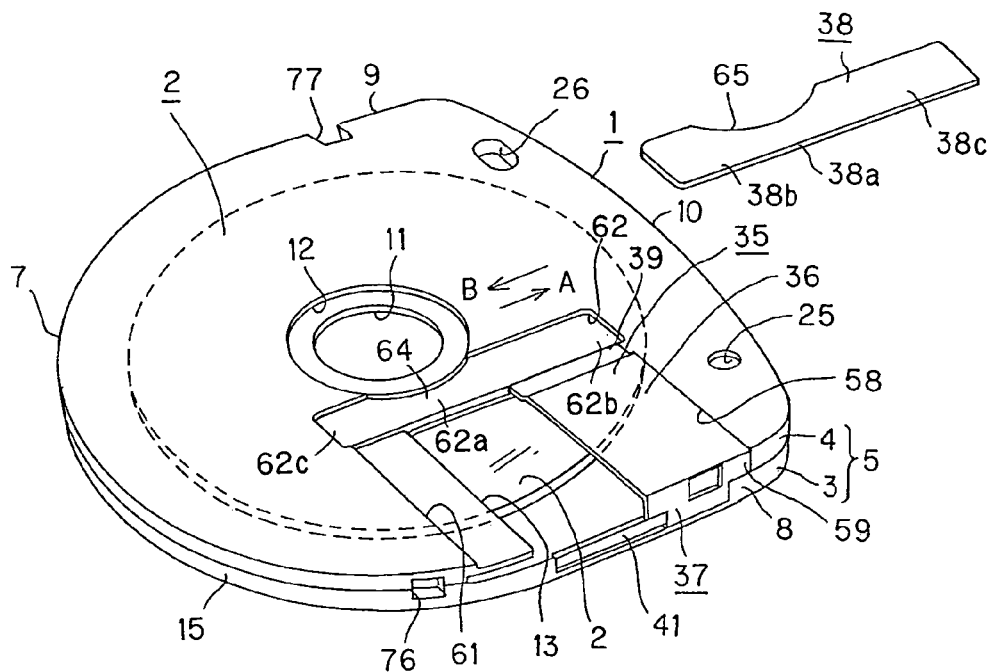
FIG. 2 is a schematic perspective view of a disc cartridge according to the invention as viewed from the side of the lower half thereof.

A disc cartridge 1 according to the invention rotatably contains therein a disc-shaped recording medium which is typically an optical disc 2. As shown in FIGS. 1 and 2, it comprises a cartridge main body 5 formed by aligning and bonding a pair of cartridge main body halves including an upper half 3 and a lower half 4. The optical disc 2 is rotatably contained in the cartridge main body 5.

The disc cartridge 1 according to the invention contains an optical disc 2 on which program data or video data to be used for executing a television game and has very small dimensions. The disc cartridge 1 typically contains an optical disc 2 having a diameter as small as about 60 mm and can be held by the palm of a hand.

Figure 3:
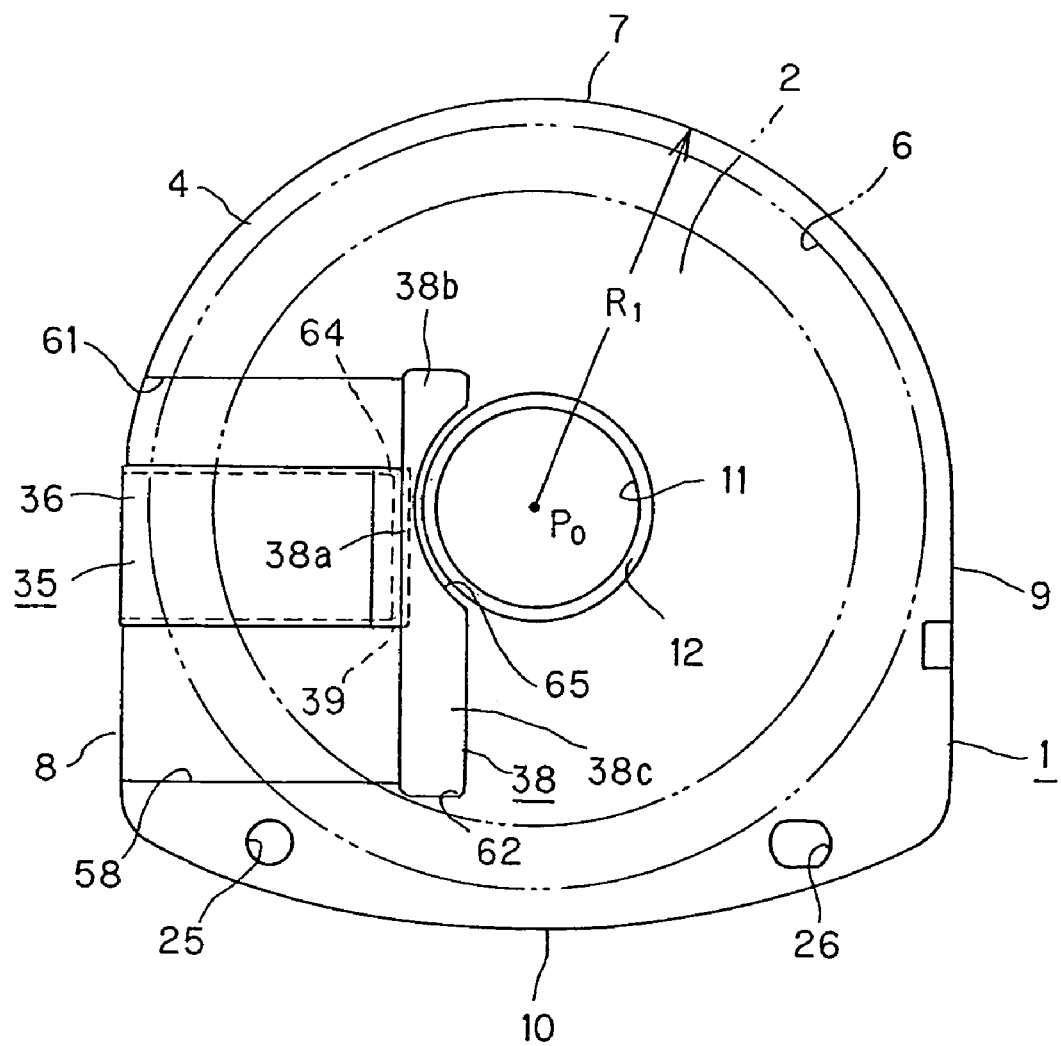
FIG. 3 is a schematic plan view of a disc cartridge according to the invention as viewed from the side of the lower half thereof.

Referring to FIGS. 1 through 3, the cartridge main body 5 of the disc cartridge 1 has an arc-shaped part 7 at the front side thereof, which operates as leading edge when the disc cartridge 1 is loaded in and unloaded from a disc recording and/or reproduction apparatus. As shown in FIG. 2, the arc-shaped part 7 is made to show a contour of the arc of a substantially semicircle having a half diameter $R_1$ with its center aligned with the center Po of the optical disc 2 contained in the disc containing section 6 of the cartridge main body 5. In other words, the arc-shaped part 7 is realized as a semicircular part that is arranged vis-à-vis a half of the optical disc 2 contained in the cartridge main body 5.

A pair of oppositely disposed lateral sides 8, 9 of the cartridge main body 5 extend continuously from the arc-shaped section 7 while the rear side of the arc-shaped part 7 forms a mildly continuously curved part 10. In other words, curved part 10 arranged at the rear side of the cartridge main body 5 has a curvature smaller than that of the arc-shaped part 7 having a large half diameter and arranged at the front side of the cartridge main body 5.

Since the disc cartridge 1 according to the invention has a substantially semicircular arc-shaped part 7 that is curved to a large extent relative to the other sides and operates as leading edge, it can be easily discriminated from the other sides when it is inserted into a slot-in type disc recording and/or reproduction apparatus by way of the cartridge loading/unloading slot of the apparatus. Particularly, in the case of a downsized disc cartridge 1 that can be held by the palm of a hand, the leading edge of the disc cartridge 1 can be identified in the palm that is holding the disc cartridge 1 so that the disc cartridge 1 can be reliably loaded in the disc recording and/or reproduction apparatus without fail. Additionally, as will be described in greater detail, the disc cartridge 1 can be inserted into a slot-in type disc recording and/or reproduction apparatus not only easily but also reliably to take the right position in the apparatus.

Still additionally, since the disc cartridge 1 according to the invention has a substantially semicircular arc-shaped part 7 at the front side thereof that operates as leading edge when inserted into a recording and/or reproduction apparatus and also a curved part 10 at the rear side thereof located opposite to the arc-shaped part 7, it can be downsized further relative to the optical disc 2 to be contained therein.

Now, the upper and lower halves 3, 4 of the cartridge main body 5 that are aligned with and bonded to each other will be described in greater detail below.

The upper and lower halves 3, 4 are formed by molding a synthetic resin material such as polycarbonate resin or ABS resin.

The lower half 4 that constitutes the lower surface of the cartridge main body 5 has at the center thereof a center hole 11 aligned with the center of the optical 2 contained in the cartridge main body 5 and a circular central aperture 12 whose peripheral edge is exposed to the outside. The central aperture 12 is adapted to snugly receive the turn table of the rotary disc drive mechanism of the disc recording and/or reproduction apparatus. In other words, the central aperture 12 operates as drive aperture for receiving part of the mechanism that drives the optical disc 2 to rotate.

Figure 4:
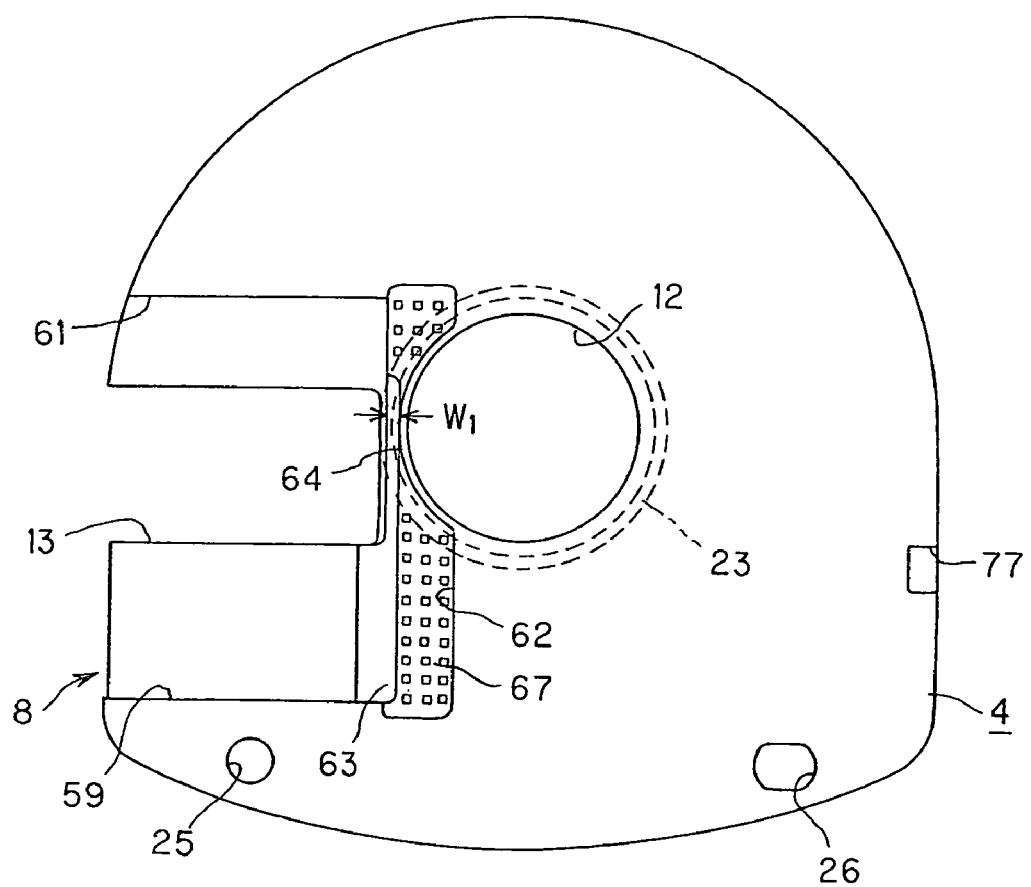
FIG. 4 is a schematic plan view of the lower half of the cartridge main body.

As shown in FIGS. 2 through 5, a head receiving aperture 13 is also formed in the lower half 4 to operate as recording and/or reproduction aperture. The head receiving aperture 13 is located at the side of the lateral side 8 of the cartridge main body 5 and extends from a position close to the central aperture 12 to the lateral side 8 to show a rectangular contour. In other words, the head receiving aperture 13 is rectangular and sufficiently large for exposing part of the signal recording region of the optical disc 2 contained in the cartridge main body 5 to the outside between the inner and outer peripheries thereof As shown in FIG. 4, the head receiving aperture 13 is formed by partly cutting away the lower half 4 from the lateral side 8. Since the lower half 4 is cut away from the lateral side 8 to produce the head receiving aperture 13, the head section of the recording and/or reproduction apparatus can scan the outermost peripheral part of the optical disc 2. In other words, the optical disc 2 can be made to have a large signal recording region and hence a large recording capacity. Additionally, since the head receiving aperture 13 is separated from the central aperture 12 with a link section arranged between itself and the central aperture 12, the lower half 4 can secure a sufficient mechanical strength.

As shown in FIG. 1, the surface of the upper half 3 of the cartridge main body 5 that is located vis-à-vis the optical disc 2 when the upper half 3 is aligned with and bonded to the lower half 4 to produce the upper surface of the cartridge main body 5 does not have any aperture so that it is very flat.

Figure 5:
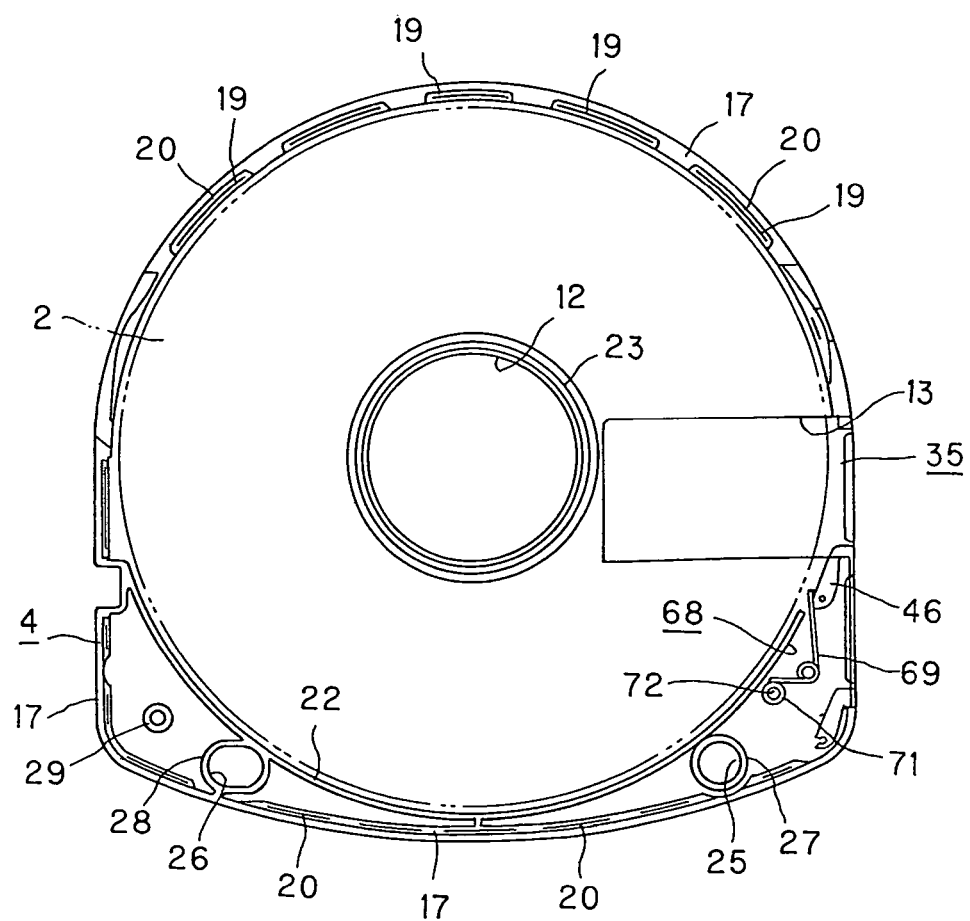
FIG. 5 is a schematic plan view of the inner surface of the lower half of the cartridge main body.
Figure 6:
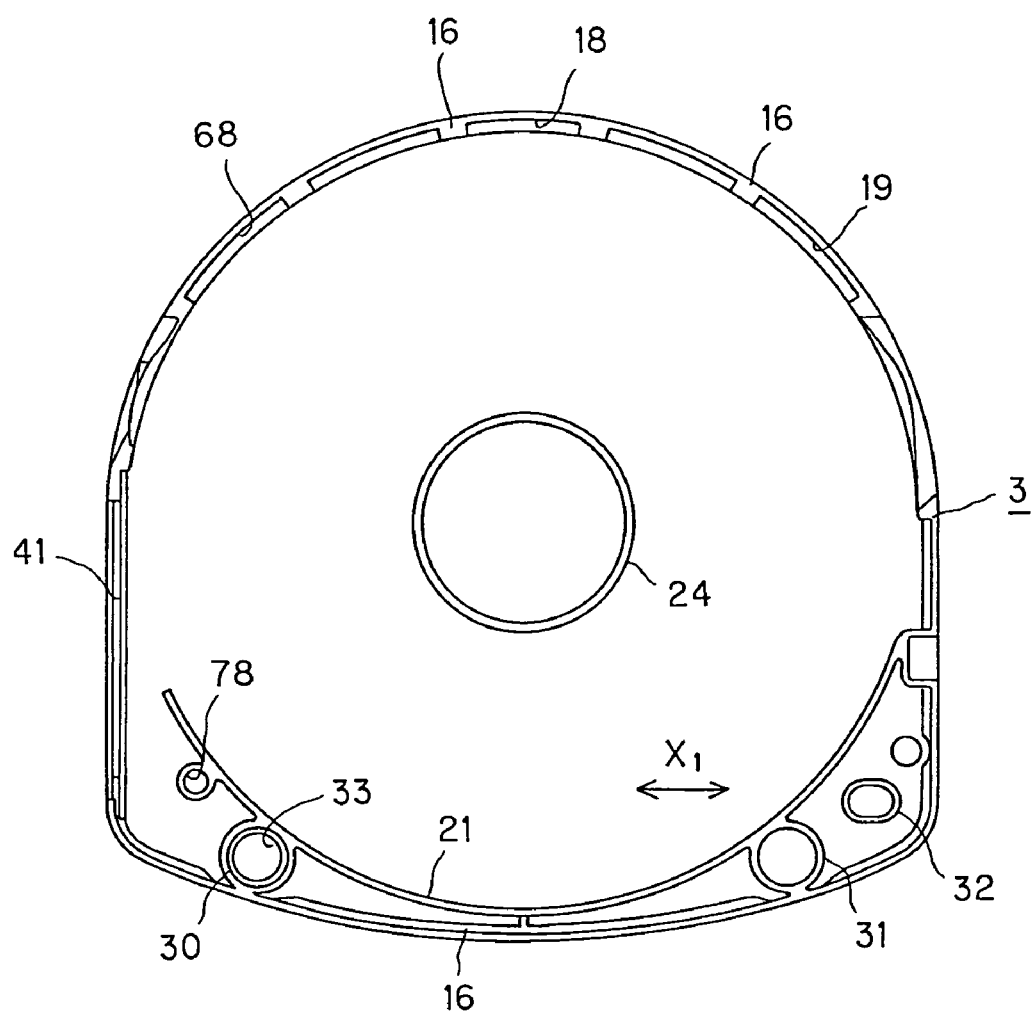
FIG. 6 is a schematic plan view of the inner surface of the upper half o the cartridge main body.

The upper and lower halves 3, 4 have respective rising peripheral walls 16, 17 that extend respectively downward and upward to form an outer peripheral wall 15 of the cartridge main body 5 when the two halves 3, 4 are aligned with and bonded to each other. As shown in FIGS. 5 and 6, the rising peripheral walls 16, 17 are formed respectively along the outer peripheral edges of the upper and lower halves 3, 4. A number of engaging recesses 18 and the same number of engaging projections 19 are formed respectively on the rising peripheral walls 16, 17 in the areas thereof where the semicircular arc-shaped sections 7 of the upper and lower halves 3, 4 are arranged so as to be mutually engaged. More specifically, an engaging recess 18 and a matching engaging projection 19 are paired and arranged at the middle point of the arc-shaped part 7 of the cartridge main body 5 where the arc-shaped section 7 defines the fore front of the cartridge main body 2 and two engaging recesses 18 and matching two engaging projections 19 are arranged at each of the lateral sides of the arc-shaped part 7 symmetrically relative to the middle point.

Figure 7:
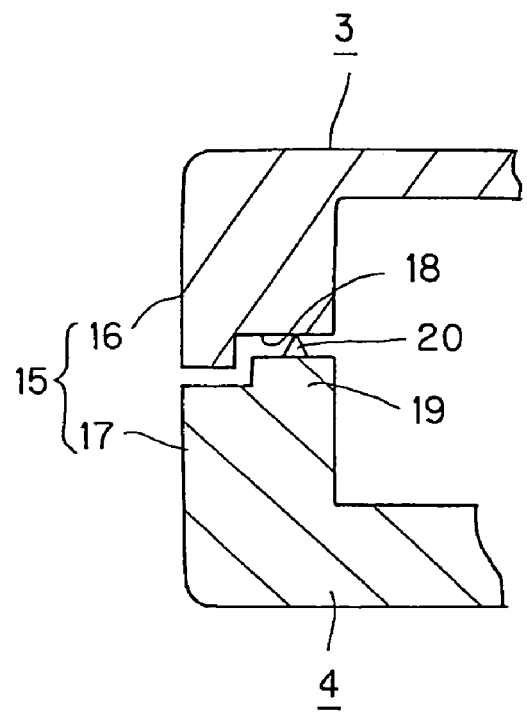
FIG. 7 is a schematic cross sectional partial view of the upper and lower halves of the cartridge main body, showing how they are aligned with and bonded to each other at the peripheral walls thereof.

Note the engaging recesses 18 are arranged on the upper half 3, whereas the engaging projections 19 are arranged on the lower half 4. As shown in FIG. 7, the engaging recesses 18 are formed by notching the inner peripheral side of the rising peripheral wall 16 of the upper half 3. On the other hand, the engaging projections 19 are formed to project upward from the front end of the rising peripheral wall 17 of the lower half 4. Each of the engaging projection 19 is provided at the front end thereof with a welding rib 20, as shown in FIG. 7.

Note that the rising peripheral wall 17 located in the curved section 10 of the lower half 4 is also provided with welding ribs 20 that are distributed at appropriate intervals.

Figure 8:
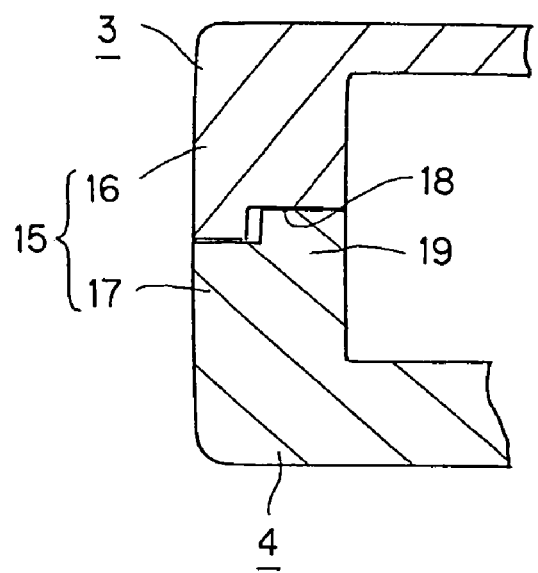
FIG. 8 is a schematic cross sectional partial view of the upper and lower halves of the cartridge main body, showing how they are aligned with and welded to each other to form an integral cartridge main body.

As the engaging recesses 18 and the corresponding engaging projections 19 are aligned and welded to each other by fusing the welding ribs 20, the rising peripheral walls 16, 17 are bonded to each other by way of the welding ribs 20 to produce the outer peripheral wall 15 of the cartridge main body 5 as shown in FIG. 8. The rising peripheral walls 16, 17 are bonded to each other by applying an ultrasonic wave to the welding ribs 20 and fusing the welding ribs 20.

As shown in FIGS. 5 and 6, the upper and lower halves 3, 4 are provided on the inner surfaces thereof that are arranged vis-à-vis respectively with arc-shaped containing section defining walls 21, 22 that form the disc containing section 6 when they are aligned. The containing section defining walls 21, 22 are formed at the rear side of the cartridge main body 5 where the curved section 10 is arranged so as to respectively show arc-shaped contours and linked to the corresponding parts of the rising peripheral walls 16, 17 of the arc-shaped section 7 located at the front side of the cartridge main body 5. Thus, when the upper and lower halves 3, 4 are aligned relative to each other, the containing section defining walls 21, 22 and the rising peripheral walls 16, 17 are also aligned to produce the circular disc containing section 6. The containing section defining walls 21, 22 and the rising peripheral walls 16, 17 are arranged to surround the outer periphery of the optical disc 2 contained in the disc containing section 6. Thus, they define the containing position of the optical disc 2 contained in the disc containing section 6 and at the same time operate as a disc protection wall that prevent foreign objects from entering the disc containing section 6.

Additionally, as shown in FIG. 5, the lower half 4 is provided on the inner surface thereof that is arranged vis-à-vis the upper half 3 with a ring-shaped disc supporting projection 23. Similarly, as shown in FIG. 6, the upper half 3 is provided on the inner surface thereof that is arranged vis-à-vis the lower half 4 with a ring-shaped disc supporting projection 24. The disc supporting projection 24 is located vis-à-vis the disc supporting projection 23 of the lower half 4. The disc supporting projections 23, 24 support the optical disc 2 contained in the disc containing section 6 at the non-signal-recording region of the optical disc 2 that is located close to the inner periphery of the optical disc 2 so as to prevent the signal recording region from directly touching the inner surfaces of the upper and lower halves 3, 4 and protect the optical disc 2.

Figure 13:
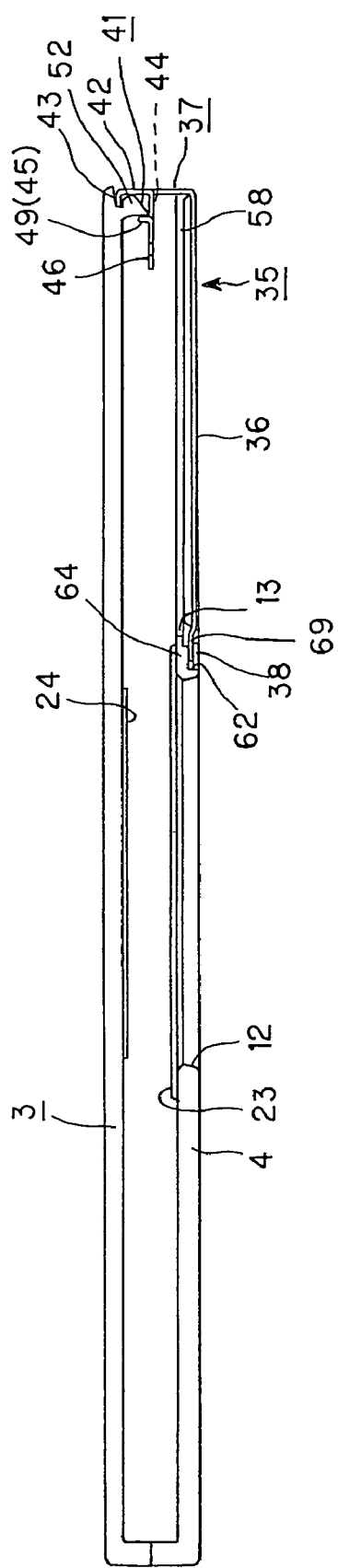
FIG. 13 is a schematic cross sectional view of the cartridge main body with the shutter member fitted thereto.

The disc supporting section 24 formed on the upper half 3 has a diameter slightly smaller than the diameter of the disc supporting projection 23 formed on the lower half 4 as shown in FIG. 13, which will be described in greater detail hereinafter.

Additionally, the lower half 4 is provided with first and second positioning holes 25, 26 that come into engagement with respective positioning pins arranged on the disc recording and/or reproduction apparatus when the disc cartridge 1 is loaded in the apparatus. As shown in FIGS. 3 and 4, the positioning holes 25, 26 are arranged at the opposite sides of the curved section 10 formed at the rear side. More specifically, as shown in FIG. 5, the first and second positioning holes 25, 26 are arranged respectively in the lateral regions defined by the containing section defining wall 22 and the part of the rising peripheral wall 17 that constitutes the curved section 10 of the cartridge main body 5. The second positioning hole 26 is an oblong hole whose major axis lies transversally in such a way that the prolonged line of the major axis crosses the lateral sides 8, 9 of the cartridge main body 5 as shown in FIGS. 3 and 4 for the purpose of adjusting the engaging position of the corresponding positioning pin.

The lower half 4 is provided on the inner surface thereof with a first engaging projection 27 having a hollow cylindrical profile and defining the first positioning hole 25 and an abutting projection 28 having a pipe-like profile and defining the second positioning hole 26. Additionally, the lower half 4 is provided at a position located in the region of the second positioning hole 26 that is one of the lateral regions defined by the containing section defining wall 22 and the rising peripheral wall 17 on the inner surface thereof with a second engaging projection 29. As shown in FIG. 5, the second engaging projection 29 is located closer to the part of the rising peripheral wall 17 that constitutes the corresponding lateral side of the cartridge main body 5 than the second positioning hole 26.

Thus, the first engaging projection 27 constitutes a first positioning section for aligning the upper and lower halves 3, 4 and the second engaging projection 29 constitutes a second positioning section for aligning the upper and lower halves 3, 4.

On the other hand, the upper half 3 is provided on the inner surface thereof with a first engaging sleeve 30 having a hollow cylindrical profile so as to be engaged with the first engaging projection 27 of the lower half 4 for alignment and a support projection 31 having a hollow cylindrical profile and adapted to abut the abutting projection 28. The upper half 3 is also provided with a second engaging sleeve 32 having a hollow cylindrical profile so as to be engaged with the second engaging projection 29 of the lower half 4 for alignment.

Figure 9:
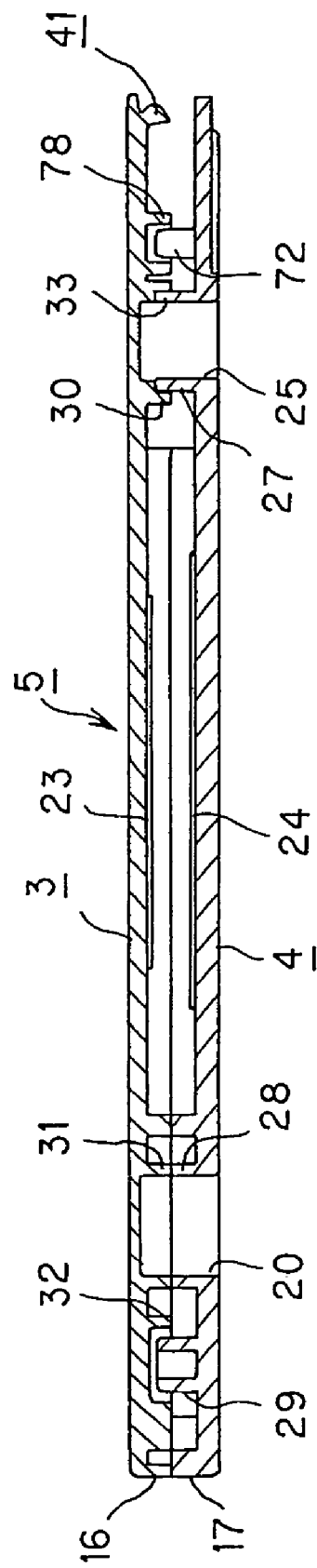
FIG. 9 is a schematic cross sectional view of the cartridge main body formed by aligning and bonding the upper and lower halves relative to each other.

As shown in FIG. 9, the first and second engaging projections 27, 29 have a height that makes them project from the front end of the rising peripheral wall 17 so that, when the rising peripheral walls 16, 17 are aligned with each other to bond the upper and lower halves 3, 4 together, they come to be engaged respectively with the first and second engaging sleeves 30, 32 whose top ends are flush with the front end of the rising peripheral wall 16.

Meanwhile, as shown in FIG. 6, the first engaging sleeve 30 and the support projection 31 formed on the upper half 3 are located respectively in the lateral regions defined by the containing section defining wall 21 and the part of the rising peripheral wall 16 that constitutes the curved section 10 of the cartridge main body 5. The second engaging sleeve 32 is located in the region where the supporting projection 31 is arranged at a position closer to the part of the rising peripheral wall 16 that constitutes the corresponding lateral side 9 of the cartridge main body 5 than the supporting projection 31.

When the first engaging projection 27 and the first engaging sleeve 30 are engaged with each other, they provide an alignment reference position for the upper and lower halves 3, 4. In other words, the upper half 3 is bonded to the lower half 4 by referring to the first engaging projection 27 formed on the lower half 4 that operates as engagement reference position. Therefore, as shown in FIG. 9, the first engaging projection 27 and the first engaging sleeve 30 have respective diameters that make them tightly engage with each other. In other words, the outer diameter of the cylindrical first engaging projection 27 and the inner diameter of the first engaging sleeve 30 for receiving a front end part of the first engaging projection 27 are made to be substantially equal to each other.

An abutting step 33 against which the front end of the first engaging projection. 27 abuts is formed in the inside of the first engaging sleeve 30. Thus, the first engaging projection 27 comes to be engaged with the first engaging sleeve 30 with its front end abutting the abutting step 33.

The second engaging sleeve 32 is made to show an elliptic profile with its major axis extending transversally along arrow $X_1$ in FIG. 6 in such a way that the prolonged line of the major axis crosses the lateral sides 8, 9 of the cartridge main body 5. Thus, when the upper and lower halves 3, 4 are aligned by referring to the first engaging projection 27 and the first engaging sleeve 30, the second engaging projection 29 can be adjusted transversally for the engaging position.

Figure 10:
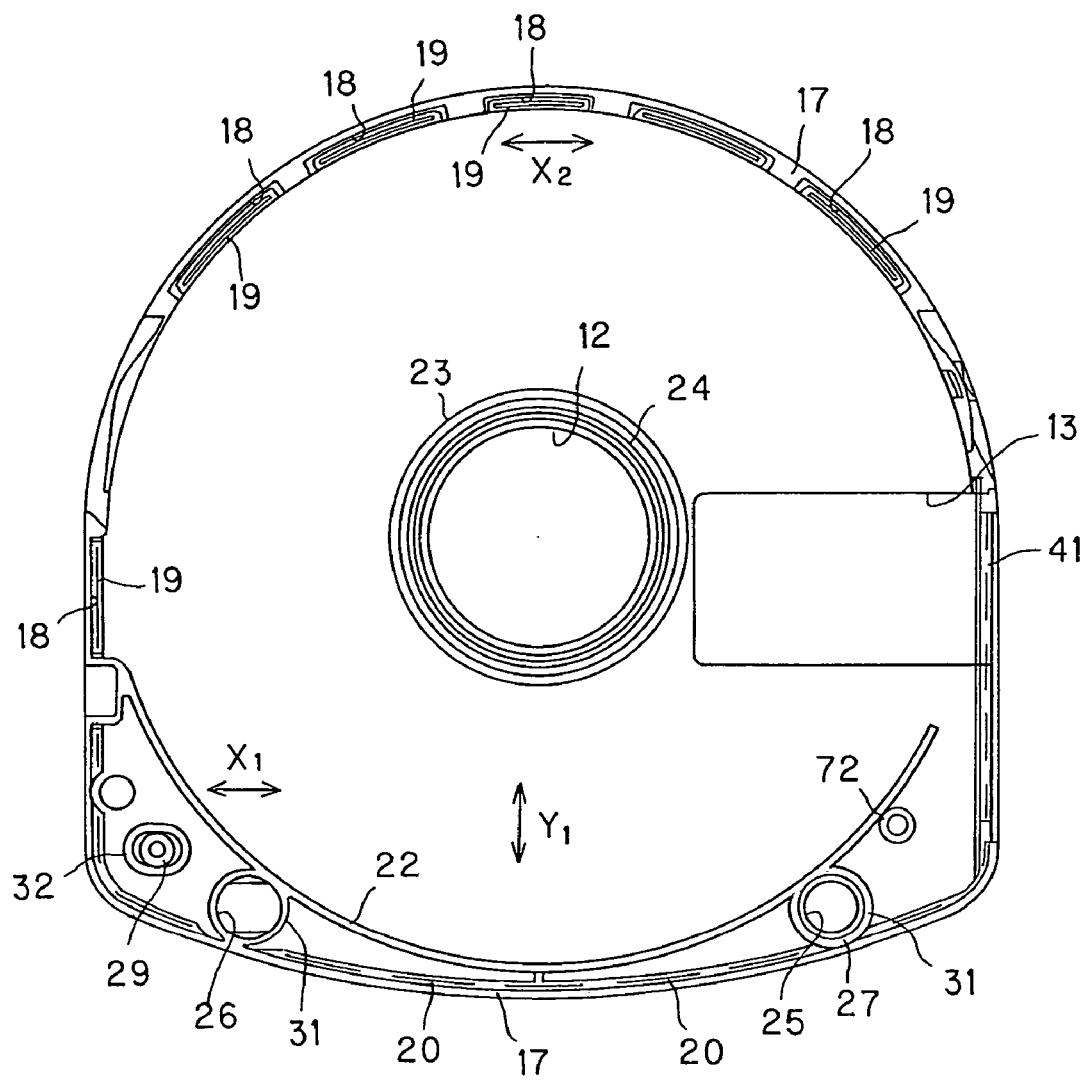
FIG. 10 is a schematic plan view of the upper and lower halves of the cartridge main body that are aligned with and bonded to each other.

As shown in FIG. 10, of the upper and lower halves 3, 4 having the above described respective configurations, the rising peripheral walls 16, 17 are aligned with each other as the first engaging projection 27 and the first engaging sleeve 30 engage with each other and the second engaging projection 29 and the second engaging sleeve 32 engage with each other while additionally the plurality of engaging recesses 18 and the corresponding respective engaging projections 19 engage with each other.

Note that, of the plurality of engaging recesses 18 and the same number of engaging projections 19 that are engaged with each other, the engaging recess 18 and the engaging projection 19 that are arranged at the middle point of the arc-shaped part 7 of the cartridge main body 5 where the arc-shaped section 7 defines the fore front of the cartridge main body 5 are designed to operate as third positioning section for aligning the upper and lower halves 3, 4 in the direction of arrow $X_2$ shown in FIG. 10 near the arc of the arc-shaped section 7 when the upper and the lower halves 3, 4 are put together for mutual alignment. In other words, the engaging recess 18 and the engaging projection 19 that are paired to constitute the third positioning section are formed so as to be tightly engaged with each other with little gap left between them. Thus, as the engaging recess 18 and the engaging projection 19 are formed with an enhanced degree of precision so as to be tightly engaged with each other with little gap left between them, they operate to align the upper and lower halves 3, 4 in the direction running along the arc of the arc-shaped section 7.

As described above, the upper and lower halves 3, 4 are aligned with each other by referring to the engaging position of the first engaging projection 27 and the first engaging sleeve 30. Then, as the second engaging projection 29 and the second engaging sleeve 32 engage with each other, the upper and lower halves 3, 4 are aligned in the direction of arrow $Y_1$ that is the longitudinal direction of the cartridge main body 5 and rectangular relative to the transversal direction of arrow $X_1$ in FIG. 10. Then, as the engaging recess 18 and the engaging projection 19 that are paired to operate as the third positioning section are engaged with each other, the upper and lower halves 3, 4 are aligned at the arc-shaped section 7 that operates as the leading edge of disc cartridge when introduced into a recording and/or reproduction apparatus.

The upper and lower halves 3, 4 that are aligned with each other in a manner as described above are bonded to each other by fusing the welding ribs 20 arranged at the front ends of the engaging projection 19 and the rising peripheral wall 17 by means of an ultrasonic welding device to produce an integral cartridge main body 5.

Since the upper and lower halves 3, 4 of the obtained cartridge main body 5 are aligned with each other highly precisely with little displacement, the disc cartridge 1 comprising the cartridge main body 5 is a high precision disc cartridge and can be smoothly loaded in and unloaded from a recording and/or reproduction apparatus. Additionally, the disc cartridge shows a neat appearance.

Figure 11:
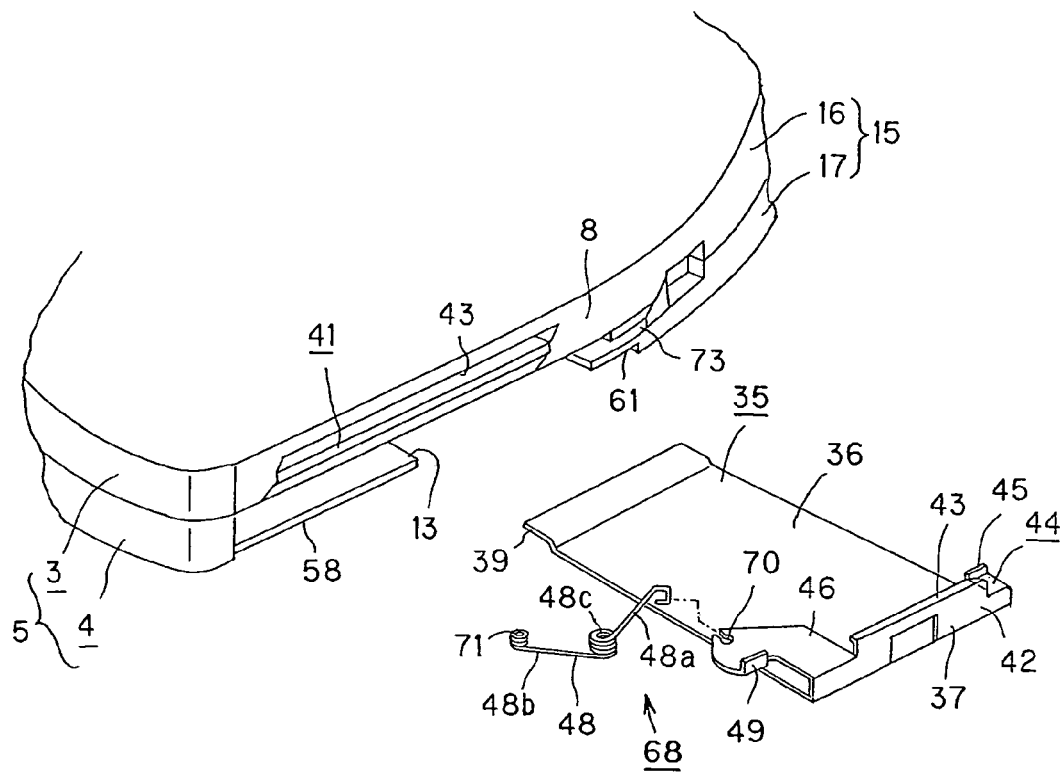
FIG. 11 is a schematic perspective view of part of the cartridge main body and a shutter member to be fitted to the cartridge main body.
Figure 12:
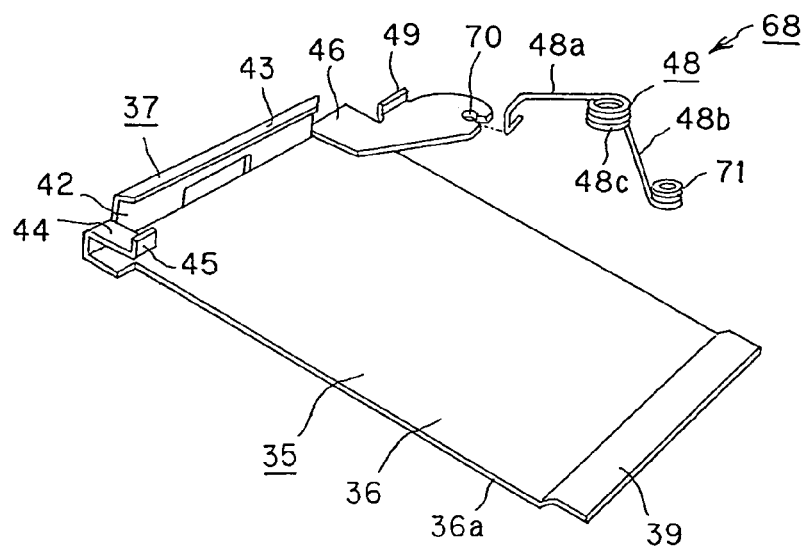
FIG. 12 is a schematic perspective view of a shutter member and a twisted coil spring for urging the shutter member.

Then, as shown in FIGS. 1, 2 and 3, a shutter member 35 for opening and closing the head receiving aperture 13 is fitted to the cartridge main body 5 produced in a manner as described above. The shutter member 35 is prepared by punching and bending a thin metal plate or molded from a synthetic resin material. As shown in FIGS. 2 and 3, the shutter member 35 includes a flat and rectangular shutter section 36 sufficiently large for closing the head receiving aperture 13 and a cartridge supporting section 37 formed at the base side of the shutter section 36 and showing a U-shaped cross section. The shutter section 36 is provided at the front end thereof with a guide-supported section 39 to be supported by a shutter guide member 38 fitted to the cartridge main body 5. As shown in FIGS. 11 and 12, the guide-supported section 39 is formed by warping the front end of the shutter section 36 so as to direct it toward the cartridge main body 5.

The shutter member 35 is supported so as to be movable in the direction of arrow A and also in the direction of arrow B shown in FIGS. 1 and 2 to open and close the head receiving aperture 13 as the slide guide section 41 formed at the upper half 3 of the cartridge main body 5 is supported by the cartridge supporting section 37. The slide guide section 41 is formed in the upper half 3 and extends over the entire stroke of movement of the shutter member 35 for opening and closing the head receiving aperture 13. The slide guide section 41 is formed at part of the rising peripheral wall 16 of the upper half 3 so as to support the shutter member 35 within a certain span of the lateral side 8 of the cartridge main body 5.

As shown in FIGS. 11 and 12, the cartridge supporting section 37 of the shutter member 35 has a link piece 42 rising perpendicularly upward from the base of the shutter section 36 and a first support piece 43 formed by bending the front end of the link piece 42 toward the shutter section 36. A second support piece 44 is formed at a lateral side of the link piece 42 also by bending the front end of the link piece 42 to make it show an L-shaped profile that is lower than the first support piece 43. Thus, an engagement piece 45 is formed at the front end of the second support piece 44 to project toward the first support piece 43. A spring anchoring piece 46 is formed at the other lateral side of the link piece 42 so as to be flush with the second support piece 44 and projecting toward the shutter section 36.

The spring anchoring piece 46 anchors part of a twisted coil spring 48 that constitutes a two-direction urging mechanism for selectively urging the shutter member 35 fitted to the cartridge main body 5 in the direction of closing the head receiving aperture 13 or in the direction of opening the head receiving aperture 13.

An engagement piece 49 is formed by bending a base part of the spring anchoring piece 46 so as to make it project toward the first support piece 43.

On the other hand, as shown in FIGS. 11 and 13, the slide guide section 41 that movably supports the shutter member 35 is formed at part of the rising peripheral wall 16 of the upper half 3. The slide guide section 41 includes a guide groove 51 formed on the outer lateral side of the rising peripheral wall 16 and running in parallel with the moving direction of the shutter member 35 as shown in FIG. 11 and a guide rail 52 pinched by the first and second support pieces 43, 44 as shown in FIGS. 13 and 14.

Figure 14:
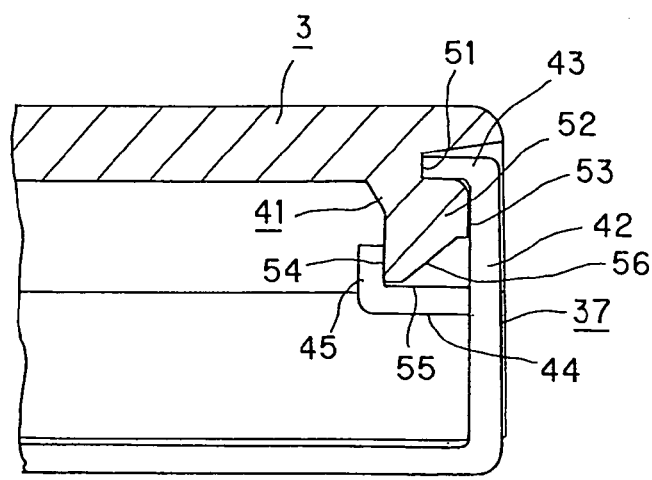
FIG. 14 is a schematic cross sectional view of the slide/guide section arranged on the upper half and supporting the shutter member.

The surface of the guide rail 52 that faces the outside of the cartridge main body 5 is perpendicular to the plane of the upper half 3 as shown in FIG. 14. The surface is arranged vis-à-vis the inner lateral surface of the link piece 42 of the slide guide section 41 to constitute a first guide wall 53 for guiding the shutter member 35 in the moving direction thereof. The other surface of the guide rail 52 facing the inside of the cartridge main body 5 runs in parallel with the first guide wall 53. This surface is arranged vis-à-vis the second support piece 44 and the spring anchoring piece 46 and constitutes a second guide wall 54 for guiding the shutter member 35 in the moving direction thereof. Additionally, the front end surface of the guide rail 52 runs perpendicularly relative to the first and second guide walls 53, 54. This surface is arranged vis-à-vis the second support piece 44 and the spring anchoring piece 46 and constitutes a third guide wall 55 for guiding the shutter member 35 in the moving direction thereof. The front corner of the rail 52 extending from the first guide wall 54 and the second guide wall 55 of the rail 52 forms a slope section 56. The slope section 56 provides an escape space when the engagement pieces 45, 49 of the shutter member 35 are engaged with the second guide wall 54 of the rail 52.

When the slide guide section 41 having the above described configuration is made to support the shutter member 35, the shutter section 36 is laid to extend on the head receiving aperture 13 of the lower half 4 and the cartridge supporting section 37 is brought into engagement with the slide guide section 41. When the slide guide section 41 is made to support the cartridge supporting section 37, firstly, the first support piece 43 is brought into engagement with the guide groove 51 and then the engagement pieces 45, 49 are made to move along the slope section 56 and face the second guide wall 54 of the guide rail 52. As the first support piece 43 is engaged with the guide groove 51 and the engagement pieces 45, 49 are made to face the second guide wall 54, the shutter member 35 comes to pinch the guide rail 52 by means of the first support piece 43, the second support piece 44 and part of the spring anchoring piece 46 so as to be movably supported by the upper half 3.

When the slide guide section 41 is in the above described state, the link piece 42 faces the first guide wall 53 and the engagement pieces 45, 49 face the second guide wall 54 while the second support piece 44 and the spring anchoring piece 46 face the third guide wall 55 so that the movement of the shutter member 35 is restricted both in the moving direction thereof and in the standing direction of the cartridge main body 5 that is perpendicular relative to the moving direction of the shutter member 35. As a result, the shutter member 35 is guided in a stable state by the slide guide section 41 without significantly rattling.

Additionally, as shown in FIGS. 13 and 14, the shutter member 35 is supported by the slide guide section 41 that is formed at the front end side of the rising peripheral wall 16 of the upper half 3, the top surface of the upper half 3 that is also the top surface of the cartridge main body 5 is totally free as shown in FIG. 1. In other words, the top surface of the upper half 3 is not exposed to any part of the slide guide section 41 when the shutter member 35 is fitted to the cartridge main body 5.

The optical disc 2 contained in the cartridge main body 5 is visible from the outside if the upper half 3 of the disc cartridge 1 having the above described configuration is made of a light transmitting material such as transparent or translucent polycarbonate resin or some other synthetic resin. Then, the optical disc 2 may be provided with a display section on the surface thereof that faces the upper half 3 so as to display characters and designs relating to the recorded contents there and make them visible from the outside of the cartridge main body 5. Thus, the user can immediately see that an optical disc 2 is contained in the disc cartridge 1 at a glance. Such a disc cartridge 1 is highly convenient for use.

In the disc cartridge 1 according to the invention, the shutter member 5 is fitted to the cartridge main body 35 in such a way that it does not project at all at least from the outer peripheral surface of the cartridge main body 5. More specifically, the shutter member 35 is fitted to the cartridge main body 5 so as to be flush with the outer peripheral surface of the cartridge main body 5. In other words, the shutter slide section 58 that is a recessed section of the lower half 4 is arranged to accommodate the movement of the shutter section 36 as shown in FIGS. 2 and 3. The shutter slide section 58 is formed as a bottomed and recessed section having a depth sufficient to prevent the shutter section 36 from projecting from the surface of the cartridge main body 5. Additionally, the lateral side 8 of the cartridge main body 5 where the link piece 42 of the slide guide section 41 moves is also provided with a sliding shutter receiving recess 59 that is directly connected to the shutter slide section 58. The sliding shutter receiving recess 59 is also a recessed section having a depth sufficient to prevent the link piece 42 from projecting form the surface of the cartridge main body 5.

The disc cartridge 1 is provided with a head accommodating recess 61 that is directly connected to the head receiving aperture 13 at a position located vis-à-vis the shutter slide section 58 with the head receiving aperture 13 interposed between them as shown in FIGS. 2 and 3. The head accommodating recess 61 is formed to allow the head section of disc recording and/or reproduction apparatus, in which the disc cartridge 1 of the present invention is loaded, to come closer to the optical disc 2. The head accommodating recess 61 has a depth greater than that of the sliding shutter receiving recess 59. Due to the provision of the head accommodating recess 61, a gap is produced between the shutter section 36 and the head accommodating section 61 when the shutter member 35 is moved to close the head receiving aperture 13. Therefore, the shutter section 36 is provided at a side thereof with a closure piece 36a for closing the gap that is formed by bending the shutter section 36.

As pointed out above, the disc cartridge 1 according to the invention is provided with the shutter guide member 38 to support the guide-supported section 39 formed at the front end of the shutter section 36, prevent the shutter section 36 from lifting up and allow the shutter member 35 to move stably. The shutter guide member 38 is formed by punching a thin plate of the material same as or similar to that of the upper and lower halves 3, 4, which is typically synthetic resin such as polycarbonate resin.

Alternatively, the shutter guide member 38 may be formed by punching a thin metal plate.

The shutter guide member 38 is used to support the guide-supported section 39 at the front end of the shutter section 36 for opening and closing the head receiving aperture 13, it is formed to have a length that allows it to be placed between the circular central aperture 12 and the head receiving aperture 13 on the outer surface of the lower half 4 that operates as one of the opposite surfaces of the cartridge main body 5 and is sufficient for supporting the sliding guide section 39 at least over the enter stroke of movement of the shutter member 35.

The shutter guide section 38 needs to be fitted in position so as to be substantially flush with the outer surface of the lower half 4 without projecting from the outer surface. Therefore, the lower half 4 is provided with a guide member fitting recess 62 so that the shutter guide member 38 is fitted to and buried in the guide member fitting recess 62 as shown in FIGS. 4 and 15.

Figure 15:
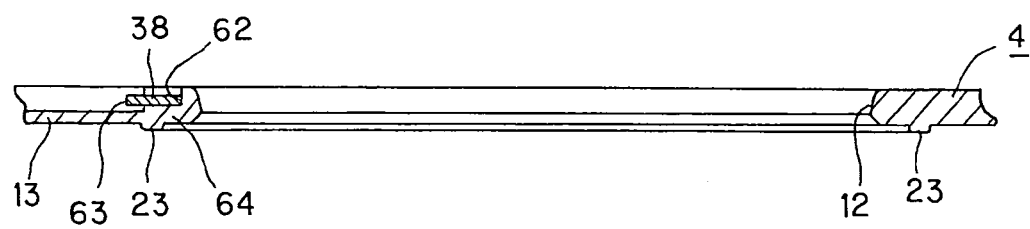
FIG. 15 is a schematic cross sectional partial view of the lower half, showing the guide member fitting recess and the central aperture thereof.

As shown in FIGS. 13 and 15, a support section sliding recess 63 is formed in the guide member fitting recess 62 at least over the entire stroke of movement of the shutter member 35 by deepening the guide member fitting recess 62. The sliding recess 63 has a depth substantially the same as the thickness of the shutter section 36.

The shutter member 35 is fitted to the cartridge main body 5 by putting the guide-supported section 39 formed at the front end of the shutter section 36 into the support section sliding recess 63 in such a way that the guide-supported section 39 is supported by the shutter guide member 38 that is fitted in the guide member fitting recess 62.

Meanwhile, the optical disc 2 contained in the disc cartridge 1 according to the invention has a wide recording region that extends from the vicinity of the central section thereof that is to be supported by the disc rotary drive mechanism to the outer peripheral edge in order to increase the recording capacity thereof. In the disc cartridge 1 containing the optical disc 2 having such a recording region, the head receiving aperture 13 that exposes the recording region of the optical disc 2 to the outside also needs to be dimensioned such that it can expose the optical disc 2 from the vicinity of the central part to the outer peripheral edge of the optical disc 2.

Therefore, the head receiving aperture 13 is formed in a region that extends a position close to the central aperture 12 to the lateral side 8 as shown in FIGS. 2 and 4. Particularly, in the illustrated instance, the head receiving aperture 13 has a rectangular contour that is open along the lateral edge 8 as shown in FIG. 4.

In the disc cartridge 1 according to the invention, the head receiving aperture 13 and the central aperture 12 are not in communication with each other. Instead, the head receiving aperture 13 and the central aperture 12 are linked by a link section 64 in order to provide the cartridge main body 5, the lower half 4 in particular, with a sufficient mechanical strength.

The link section 64 shows an arc-shaped contour line along the central aperture 12 at the side thereof that faces the central aperture 12.

Since the head receiving aperture 13 is formed to a position close to the central aperture 12 in order to reliably expose the optical disc 2 to the outside almost down to the inner peripheral side thereof, the link section 64 arranged between the head receiving aperture 13 and the central aperture 12 has a small width. As a result, it is difficult to provide a sufficiently large area for reliably bonding the shutter guide member 38 to the lower half 4 typically by welding between the head receiving aperture 13 and the central aperture 12.

Figure 16:
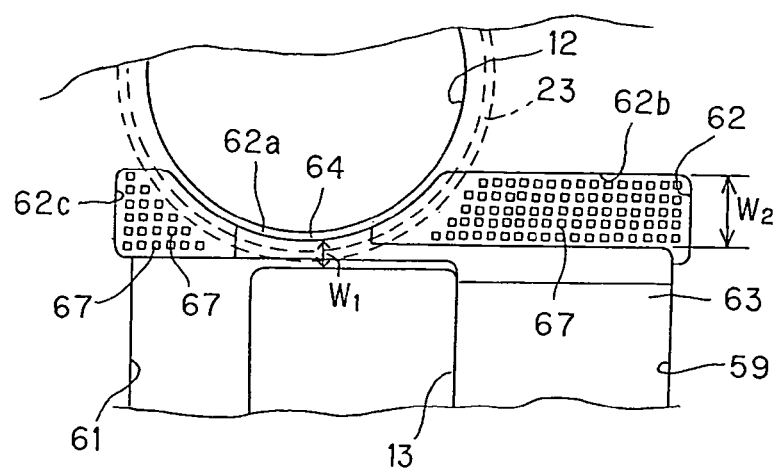
FIG. 16 is a schematic plan view of the link area of the central aperture and the head receiving aperture where the guide member fitting recess is provided.

Therefore, in the disc cartridge 1 according to the invention, the shutter guide member 38 is fitted to the disc cartridge main body 5 in such a way that a large bonding area can be secured at each of the opposite lateral sides of the narrow link section 64 between the head receiving aperture 13 and the central aperture 12. As shown in FIG. 4, the guide member fitting recess 62 to which the shutter guide member 38 is fitted is so formed as to extend from a region where the shutter member 35 faces the sliding shutter receiving recess 59 when the shutter member 35 is moved to expose the head receiving aperture 13 to a region where the shutter member 35 faces the head receiving aperture 13 and the central aperture 12 when the shutter member 35 is moved to close the head receiving aperture 13 and further to a region where the head accommodating recess 61 is provided. In other words, the guide member fitting recess 62 extends to opposite sides of the central aperture 12 to which the narrow link section 64 partly occupying it at a middle part thereof when viewed from above as shown in FIGS. 4 and 16. Thus, the link section 64 is a narrow section having an arc shaped contour line at the side thereof facing the central aperture 12.

As shown in FIG. 16, the guide member fitting recess 62 is a substantially rectangular area including bonding regions 62b, 62c extending to opposite sides of the central aperture 12 and having a width $W_2$ that is sufficiently larger than the width $W_1$ of narrow region 62a that corresponds to the link section 64. Each of the bonding regions 62a, 62b has an arc-shaped contour line at the side facing the central aperture 12 and linked to the narrow region 62a that matches the corresponding outer peripheral edge of the central aperture 12.

Additionally, as shown in FIGS. 2 and 4, the guide member fitting recess 62 extends further from the shutter slide section 58 and also from the head accommodating recess 61 that are recesses formed respectively at the opposite sides of the head receiving aperture 13. In other words, the guide member fitting recess 62 has a length that makes it extends further from the remote edges of the shutter slide section 58 and the head accommodating recess 61 in the direction of loading the disc cartridge 1 into and unloading it from the recording and/or reproduction apparatus.

The wide bonding regions 62b, 62c are provided therein with welding ribs 67 that are micro-projections for bonding the shutter guide member 38 thereto. As a matter of fact, a large number of welding ribs 67 are formed and arranged in the form of a matrix in the bonding regions 62b, 62c as shown in FIG. 16. The welding ribs 67 are arranged along part of the outer periphery of the ring-shaped disc supporting projection 23 projecting to surround the central aperture 12 in order to allow a welding jig to reliably support the area where the shutter guide member 38 is bonded.

While no welding rib 67 is arranged in the narrow region 62a that corresponds to the link section 64 where the disc supporting projection 23 is arranged in the illustrated instance, welding ribs 67 may also be arranged in that region. If such is the case, the welding jig has to show a profile adapted to support the link section 64 having an arc-shaped contour line.

The shutter guide member 38 that is fitted to the guide member fitting recess 62 has a profile that corresponds to that of the guide member fitting recess 62 as shown in FIG. 2. In other words, the shutter guide member 38 has wide bonding regions 38b, 38c located at the opposite sides of the link section 38a that corresponds to the narrow region 62a of the guide member fitting recess 62. The link section 38a has an arc-shaped notched section 65 at the side thereof facing the central aperture 12 that matches the outer peripheral edge of the central aperture 12.

The shutter guide member 38 is aligned with the guide member fitting recess 62 particularly in terms of the arc-shaped notched section 65 and the outer peripheral edge of the central aperture 12 and arranged in the guide member fitting recess 62. Then, the shutter guide member 38 is secured to the guide member fitting recess 62 as the bonding sections 38b, 38c are bonded respectively to the bonding regions 62b, 62c by welding.

Since the guide member fitting recess 62 is made to show a length extending itself further from the remote edges of the shutter slide section 58 and the head accommodating recess 61 in the direction of loading the disc cartridge 1 into and unloading it from the recording and/or reproduction apparatus, the shutter guide member 38 that is fitted to the guide member receiving recess 62 is also made to have a length that makes itself extend further from the remote edges of the shutter slide section 58 and the head accommodating recess 61.

Since the shutter guide member 38 is longer than the distance between the remote edges of the shutter slide section 58 and the head accommodating recess 61, it can be welded and reliably fitted to the lower half 4 from end to end.

The shutter guide member 38 is welded to the guide member fitting recess 62 in the following manner. Firstly, the lower half 4 is placed in position on the welding jig and the shutter guide member 38 is placed in the guide member fitting recess 62. At this time, the shutter guide member 38 is arranged in the guide member fitting recess 62 so as to make the arc-shaped notched section 65 thereof to be snugly aligned with the outer peripheral edge of the central aperture 12. Then, an ultrasonic wave is applied to the bonding regions 62b, 62c on which the bonding sections 38b, 38c are respectively laid to fuse the welding ribs 67 until the bonding sections 38b, 38c are securely bonded respectively to the bonding regions 62b, 62c. As a result of the welding, the shutter guide member 38 is fitted to the inside of the guide member fitting recess 62. At this time, the side of the shutter guide member 38 that faces the head receiving aperture 13 is located above the support section sliding recess 63 and produces a space between the shutter guide member 38 and the support section sliding recess 63 that is sufficiently large for receiving the guide-supported section 39 formed at the front end of the shutter section 36.

Since the shutter guide member 38 is to be fitted to the cartridge main body 5 as the wide bonding sections 38b, 38c formed at the opposite ends thereof are firmly bonded to the guide member fitting recess 62, it can be reliably fitted to the cartridge main body 5 with the narrow link section 38a between the bonding sections 38b, 38c snugly positioned between the central aperture 12 and the head receiving aperture 13.

As the shutter member 35 is fitted to the cartridge main body 5 to which the shutter guide member 38 has already been fitted, the guide-supported section 39 arranged at the front end of the shutter section 36 is supported by the shutter guide member 38 so that the shutter section 36 is prevented from lifting up from the cartridge main body 5. As a result, the shutter member 35 can be stably moved on the surface of the cartridge main body 5 without allowing the shutter section 36 to lift up from the inside of the shutter slide section 58. Additionally, since the front end of the shutter section 36 is supported by the shutter guide member 38, shutter section 36 is prevented from colliding with any of the various mechanism sections arranged in the recording and/or reproduction apparatus when the disc cartridge 1 is loaded into and unloaded from the recording and/or reproduction apparatus. Thus, the disc cartridge 1 can be loaded and unloaded stably and both the disc cartridge 1 and the recording and/or reproduction apparatus that receives the disc cartridge 1 are protected against damages.

The shutter guide member 38 that is to be fitted to the cartridge main body 5 is provided with an arc-shaped notched section 65 at the side opposite to the side for supporting the shutter section 36, or at the side facing the central aperture 12, so that the central aperture 12 is not closed, if partly, by the shutter guide member 38 and hence the rotary drive mechanism such as the turn table of the recording and/or reproduction apparatus is not prevented from entering the central aperture 12. Particularly, since the arc-shaped notched section 65 has a radius of curvature greater than the radius of curvature of the arc-shaped section of the guide member fitting recess 62 arranged at a side of the narrow region 62a and showing a contour line that matches the contour of the central aperture 12, it is possible to reliably fit the shutter guide member 38 into the guide member fitting recess 62 without interfering with the central aperture 12.

In the illustrated instance, the shutter guide member 38 is fitted to the cartridge main body 5 by welding. However, it may alternatively be fitted to the cartridge main body 5 by means of an adhesive agent such as a double side sticky tape. Still alternatively, the cartridge main body 5 may be provided with a caulking pin, which is inserted into a hole arranged at the shutter guide member 38 and secured to the shutter guide member 38 by way of a thermal caulking process for thermally deforming the front end of the pin.

Thus, the shutter member 35 of the disc cartridge 1 according to the invention supports the slide guide section 41 formed on the upper half 3 by means of the cartridge supporting section 37 formed at the base side of the shutter section 36 so as to pinch the slide guide section 41 and the guide-supported section 39 formed at the front end of the shutter section 35 is supported by the guide member 38. Consequently, the entire shutter member 35 including the shutter section 36 can be stably fitted to the cartridge main body 5 so as to be movable along the outer surface of the cartridge main body 5.

As a result, the disc cartridge 1 can be stably loaded into and unloaded from the recording and/or reproduction apparatus and the shutter member 35 is prevented from being inadvertently subjected to violent force and damaged.

Meanwhile, the disc cartridge 1 according to the invention is provided with a two-directional urging mechanism 68 for reliably moving the shutter member 35 for opening and closing the head receiving aperture 13 and holding the shutter member 35 at the position where it exposes the head receiving aperture 13 and the position where it closes the head receiving aperture 13. The two-directional urging mechanism 68 is adapted to urge the shutter member 35 to expose the head receiving aperture 13 or close the head receiving aperture 13 depending on the position of the shutter member 35 relative to the cartridge member 5. In other words, it operates as shutter opening/closing mechanism.

Figure 17:
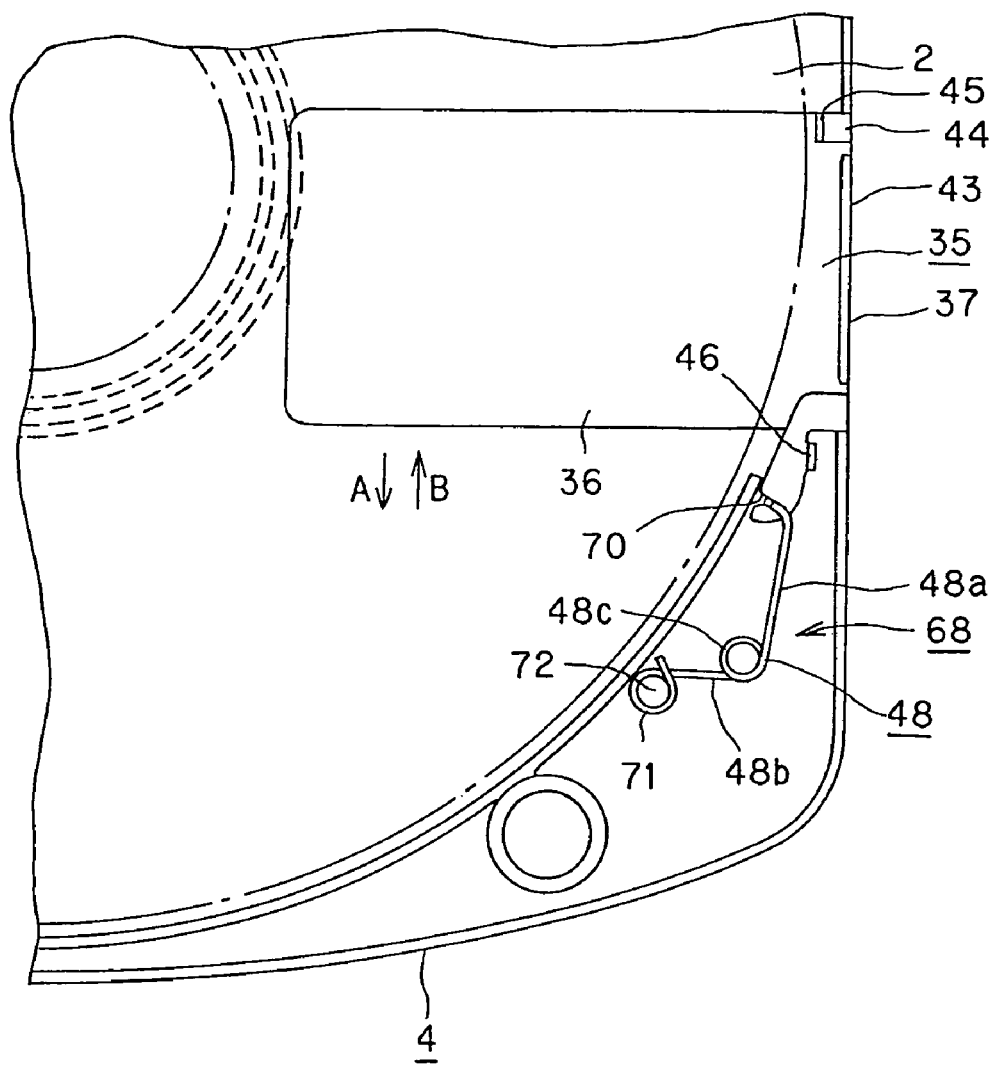
FIG. 17 is a schematic plan view of the shutter member urged to become opened and closed by a two-directional urging mechanism and that completely closes the head receiving aperture.

The two-directional urging mechanism 68 is formed by using a two-directional urging member that is adapted to selectively urge the shutter member 35 to move either in the direction for exposing the head receiving aperture 13 or in the direction for closing the head receiving aperture 13. More specifically, as shown in FIGS. 11, 12 and 17, a twisted coil spring 48 is used for it. The twisted coil spring 48 is anchored at an end to the shutter member 35 and at the other end to the cartridge main body 5. As shown in FIG. 17, the twisted coil spring 48 is arranged at the side of the position of the shutter member 35 where the latter exposes the head receiving aperture 13. In other words, the twisted coil spring 48 is arranged at a position upstream in the direction along which the shutter member 35 moves from the position where it closes the head receiving aperture 13 to the position where it exposes the head receiving aperture 13.

The twisted coil spring 48 of the two-directional urging mechanism 68 is anchored at the front end of one of the arm sections thereof, or the arm section 48a, to the engaging section 70 formed at the front end of the spring anchoring piece 46 and engaged at the annular section 71 formed at the front end of the other arm section 48b with the support pin 72 projecting from the inner surface of the lower half 4.

The upper half 3 is provided at a position vis-à-vis the support pin 72 of the lower half 4 with a cylindrical sleeve section 78 for receiving the front end of the support pin 72. As the support pin 72 is received in the sleeve section 78, the annular section 71 of the twisted coil spring 48 that is engaged with the support pin 72 is prevented from slipping off.

When the shutter member 35 is at the position for closing the head receiving aperture 13, the twisted coil spring 48 urges the shutter member 35 in the direction of arrow B in FIG. 17 so as to force it to keep on closing the head receiving aperture 13. As the disc cartridge 1 is loaded into the disc recording and/or reproduction apparatus and the shutter member 35 is moved relative to the cartridge main body 5 in the direction of arrow A in FIG. 17 to expose the head receiving aperture 13, the position of the coil section 48c formed at the center of the twisted coil spring 48 that is not fixed moves in the moving direction of the shutter member 35 as indicated by arrow A. Then, as the coil section 48c of the twisted coil spring 48 moves further in the direction of arrow A until it passes by the support pin 72 located at the downstream of the moving direction of the shutter member 35, the urging direction of the twisted coil spring 48 is inverted. As the urging direction is inverted, the twisted coil spring 48 urges the shutter member 35 so as to move in the direction of arrow A in FIG. 17 to expose the head receiving aperture 13 and holds the shutter member 35 to the position where it exposes the head receiving aperture 13 as shown in FIG. 18.

Figure 18:
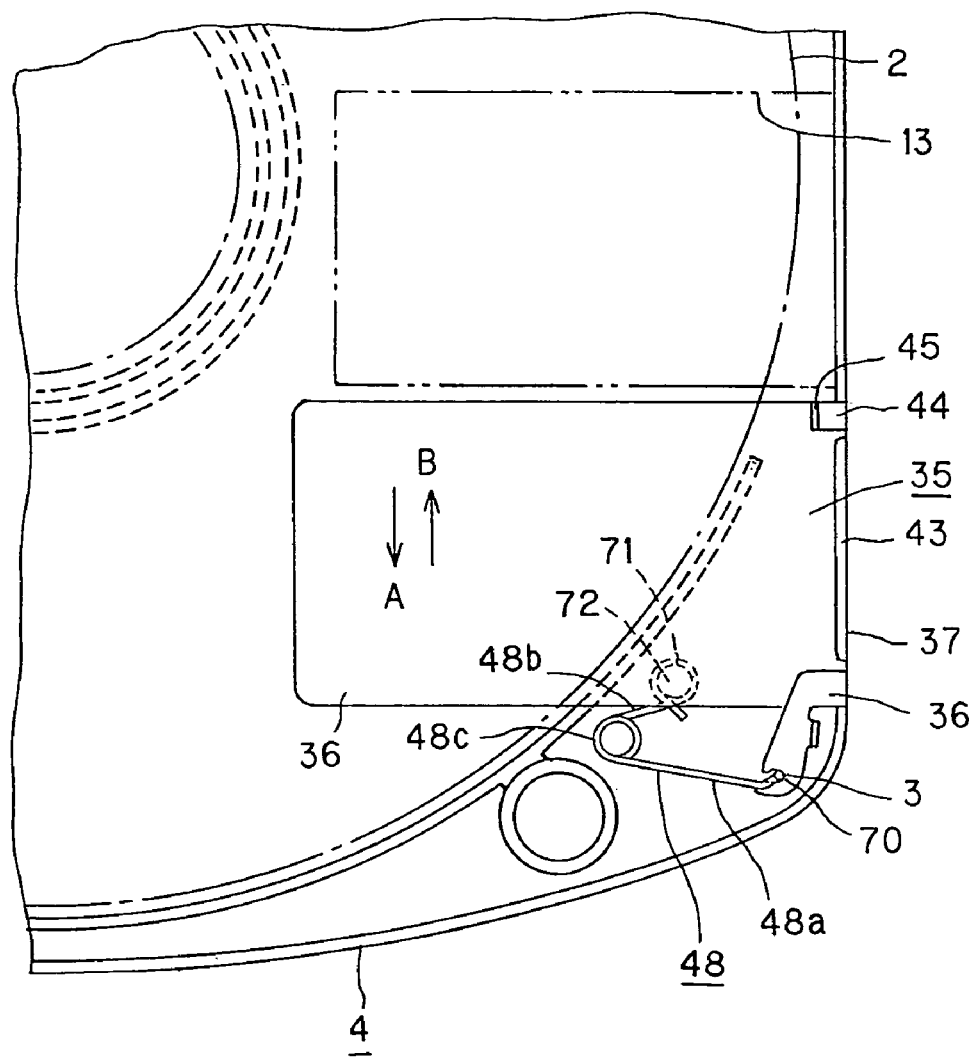
FIG. 18 is a schematic plan view of the shutter member that completely closes the head receiving aperture.

When the shutter member 35 is held to the position where it exposes the head receiving aperture 13 and the disc cartridge 1 is ejected from the disc recording and/or reproduction apparatus, the shutter member 35 moves in the direction of arrow B in FIG. 18 so that the coil section 48c at the center of the twisted coil spring 48 also moves in the same direction of arrow B. As the shutter member 35 moves further in the direction of arrow B and the coil section 48c moves further in the moving direction of the shutter member 35 until it passes by the position of the support pin 72 at the downstream of the moving direction of the shutter member 35, the urging direction of the twisted coil spring 48 is inverted. As the urging direction is inverted, the twisted coil spring 48 urges the shutter member 35 to move in the direction of arrow B in FIG. 17 to close the head receiving aperture 13 and hold the shutter member 35 to the position it closes the head receiving apparatus 13.

Thus, the shutter member 35 urged by the twisted coil spring 48 of the two-directional urging mechanism 68 is held both to the position for closing the head receiving aperture 13 and to the position for exposing the head receiving aperture 13 under the effect of the urging force of the twisted coil spring 48 and hence can reliably keep on exposing or opening the head receiving aperture 13.

While the shutter member 35 of the above described disc cartridge 1 is held to the position for closing the head receiving aperture 13 by the twisted coil spring 48 of the two-directional urging mechanism 68, the disc cartridge 1 may additionally comprise a shutter member locking mechanism. Such a shutter member locking mechanism may be formed by a lock lever that is arranged at the spring anchoring piece 46 of the shutter member 35 and urged to turn by a spring. Then, the lock lever is operated to turn in response to the operation of loading the disc cartridge 1 into or unloading it from the disc recording and/or reproduction apparatus so as to lock or unlock the shutter member 35.

In the disc cartridge 1 according to the invention, a guide groove 73 is formed at the lateral side 8 of the cartridge main body 5 where the shutter member 35 is fitted in order to receive a shutter member releasing piece arranged on the disc recording and/or reproduction apparatus as shown in FIGS. 1 and 11.

In the disc cartridge 1 according to the invention, loading engagement pieces 75, 76 are provided respectively at the lateral sides 8, 9 of the cartridge main body 5 relative to the arc-shaped section 7 as shown in FIGS. 1 and 2. The loading engagement pieces 75, 76 are to be engaged with part of the cartridge loading mechanism of the disc recording and/or reproduction apparatus into which the disc cartridge 1 loaded.

Additionally, in the disc cartridge 1 according to the invention, an engagement recess 77 for disc ejection is provided at the lateral side 9 of the cartridge main body 5 relative to the arc-shaped section 7 as shown in FIG. 2. The engagement recess 77 for disc ejection is to be engaged with part of the ejection mechanism of the disc recording and/or reproduction apparatus.

Further, a discrimination hole or discrimination recess for discriminating the types of the optical disc 2 to be contained is provided at the lateral sides 8, 9 or the base side of the cartridge main body 5, if necessary.

While a downsized disc cartridge 1 having a leading edge showing a semicircular contour is described above, the present invention is by no means limited to such a disc cartridge. For example, a disc cartridge having a rectangular cartridge main body and a disc cartridge whose cartridge main body is provided with recording and/or reproduction apertures respectively on the upper and lower surfaces thereof for the purpose of receiving a motor are also found within the scope of the present invention and provide advantages similar to those of the above described disc cartridge.

Thus, the present invention provides a disc cartridge having a shutter member for exposing and closing a recording and/or reproduction aperture arranged on the cartridge main body that finds a broad scope of application.

What is claimed is:

1. A disc cartridge comprising:
a cartridge main body formed by aligning and bonding paired upper and lower halves to rotatably contain a disc therein and having a drive aperture for receiving rotary disc drive means for driving the disc to rotate at least one of a recording and reproduction aperture to be exposed to at least one of recording and reproduction means for at least one of recording information on and reproducing information from the disc only on a first surface of the cartridge main body;
a shutter member having a shutter section for closing at least one of the recording and reproduction aperture and fitted to the cartridge main body so as to be supported at a lateral side perpendicular to the first surface of the cartridge main body and able to open and close at least one of the recording and reproduction aperture; and
a shutter guide member arranged between the drive aperture and at least one of the recording and reproduction aperture to support the shutter section at a front end thereof,
wherein the shutter guide member is provided with an arc-shaped notched section matching the peripheral edge of the circular drive aperture.

2. The disc cartridge according to claim 1, wherein the cartridge main body has an arc-shaped semicircular part centered at the center of the disc contained in the cartridge main body as leading edge thereof relative to at least one of a recording and reproduction apparatus.

3. The disc cartridge according to claim 1, wherein the shutter guide member is arranged in a recess formed on an opposite surface of the cartridge main body and the recess is provided with an arc-shaped section corresponding to the arc-shaped notched section formed in the shutter guide member, the notched section having an arc-shaped profile with a radius of curvature larger than that of the arc-shaped section.

4. The disc cartridge according to claim 1, wherein the shutter guide member is fitted to the cartridge main body by ultrasonic welding at the opposite parts thereof relative to the narrowed part having the arc-shaped notched section that is excepted from ultrasonic welding.

5. The disc cartridge according to claim 1, wherein a second surface on which the shutter member moves is a flat surface running in parallel with the moving direction of the shutter member.

6. The disc cartridge according to claim 1, wherein the upper half of the cartridge main body that provides the other surface thereof is made of a material that makes the inside of the cartridge main body visible.

7. The disc cartridge according to claim 1, wherein the shutter guide member is formed so as to project from the range of opening and closing motion of the shutter section in the disc loading/unloading direction.

8. The disc cartridge according to claim 1, wherein the shutter member is bent toward the cartridge main body at the front end thereof.

9. A disc cartridge comprising:
a cartridge main body formed by aligning and bonding paired upper and lower halves to rotatably contain a disc therein and having a drive aperture configured to receive a rotary disc drive unit configured to drive the disc to rotate at least one of a recording and reproduction aperture to be exposed to at least one of recording and reproduction unit configured to record information on or reproduce information from the disc only on a first surface of the cartridge main body;
a shutter member having a shutter section configured to close at least one of the recording and reproduction aperture and fit to the cartridge main body so as to be supported at a lateral side perpendicular to the first surface of the cartridge main body and able to open and close at least one of the recording and reproduction aperture; and
a shutter guide member arranged between the drive aperture and at least one of the recording and reproduction aperture to support the shutter section at a front end thereof,
wherein the shutter guide member is provided with an arc-shaped notched section matching the peripheral edge of the circular drive aperture.

10. The disc cartridge according to claim 9, wherein the cartridge main body has an arc-shaped semicircular part centered at the center of the disc contained in the cartridge main body as leading edge thereof relative to at least one of a recording and reproduction apparatus.

11. The disc cartridge according to claim 9, wherein the shutter guide member is arranged in a recess formed on an opposite surface of the cartridge main body and the recess is provided with an arc-shaped section corresponding to the arc-shaped notched section formed in the shutter guide member, the notched section having an arc-shaped profile with a radius of curvature larger than that of the arc-shaped section.

12. The disc cartridge according to claim 9, wherein the shutter guide member is fitted to the cartridge main body by ultrasonic welding at the opposite parts thereof relative to the narrowed part having the arc-shaped notched section that is excepted from ultrasonic welding.

13. The disc cartridge according to claim 9, wherein a second surface on which the shutter member moves is a flat surface running in parallel with the moving direction of the shutter member.

14. The disc cartridge according to claim 9, wherein the upper half of the cartridge main body that provides the other surface thereof is made of a material that makes the inside of the cartridge main body visible.

15. The disc cartridge according to claim 9, wherein the shutter guide member is formed so as to project from the range of opening and closing motion of the shutter section in the disc loading/unloading direction.

16. The disc cartridge according to claim 9, wherein the shutter member is bent toward the cartridge main body at the front end thereof.

* * * * *